Feb. 3, 1925.

J. W. HARTLEY ET AL 1,525,297

PURIFICATION OF SEWAGE

Filed Sept. 15, 1923 2 Sheets-Sheet 1

Inventors
J. W. Hartley
C. J. Hartley
J. A. Hartley

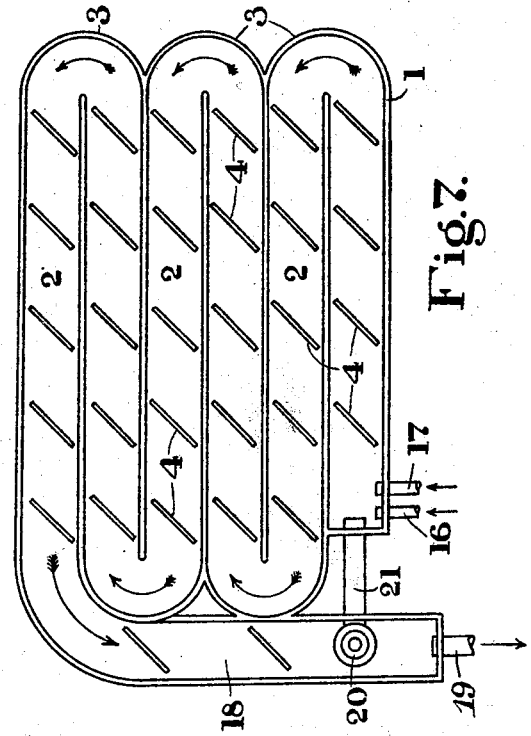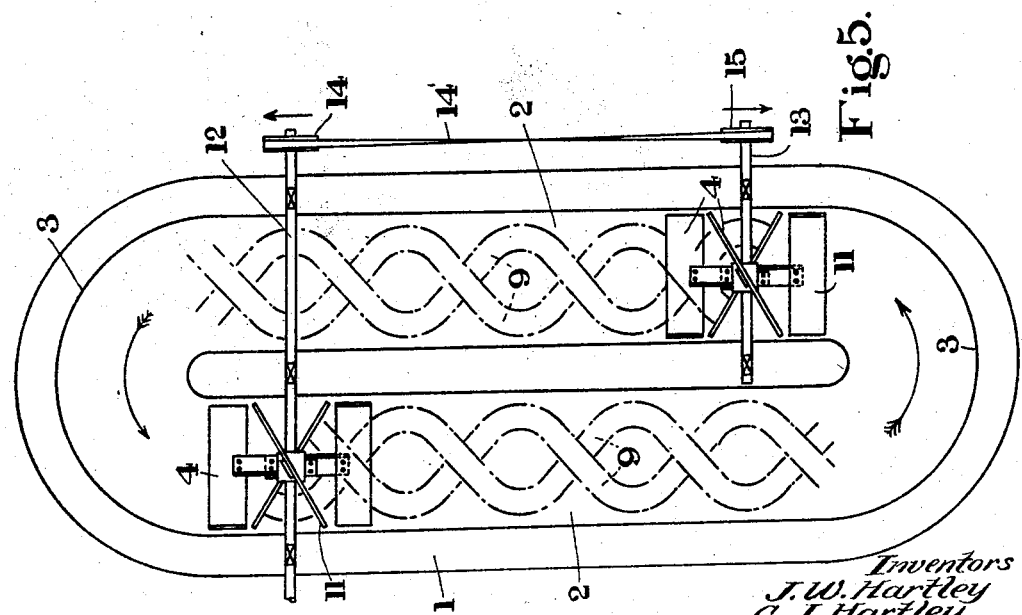

Patented Feb. 3, 1925.

1,525,297

UNITED STATES PATENT OFFICE.

JOHN WILLIAM HARTLEY, CYRIL JOHN HARTLEY, AND JOSEPH AUGUSTINE HARTLEY, OF STOKE-ON-TRENT, ENGLAND.

PURIFICATION OF SEWAGE.

Application filed September 15, 1923. Serial No. 662,888.

*To all whom it may concern:*

Be it known that we, JOHN WILLIAM HARTLEY, CYRIL JOHN HARTLEY, and JOSEPH AUGUSTINE HARTLEY, all subjects of the King of Great Britain, residing at Stoke-on-Trent, Staffordshire, England, have invented certain new and useful Improvements in the Purification of Sewage, of which the following is a specification.

This invention relates to improvements in and connected with sewage tanks for use in the activated sludge or bio-aeration system of purifying sewage according to which the sewage to be treated, mixed with a small proportion of activated sludge, is circulated in open channels, usually arranged side by side, the lineal velocity of the flow of sewage in the channels being such that settlement of the solids in suspension during circulation is prevented. In this system two requirements are essential viz, constant change of surface water for the purpose of aeration during circulation, and prevention of settlement of suspended matter in sewage. In order to secure the latter requirement it has been the practice to maintain a high velocity of flow in the channels for example one to two feet per second. This absorbs considerable power chiefly on account of friction where the sewage flows round bends at high speed. Moreover under existing conditions sufficient sewage is not exposed to air at the surface during the course along the straight portions of the channels.

These difficulties are overcome by the invention in an economical manner both as regards construction and use.

Several forms of the invention are illustrated by the accompanying drawings in which:

Figures 5 and 6 are respectively a plan and an elevation of a tank fitted with a further form of the invention.

Figure 7 is a plan showing the invention applied to a sewage tank wherein the circulation is effected by gravity.

Figure 2:
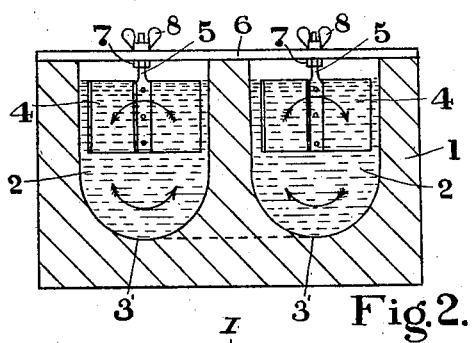
Figure 2 is a cross section of Figure 1.
Figure 3:
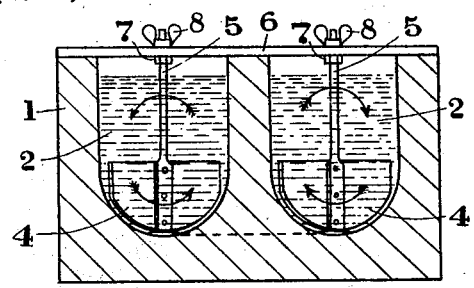
Figure 3 is a cross section illustrating another form of the invention.
Figure 1:
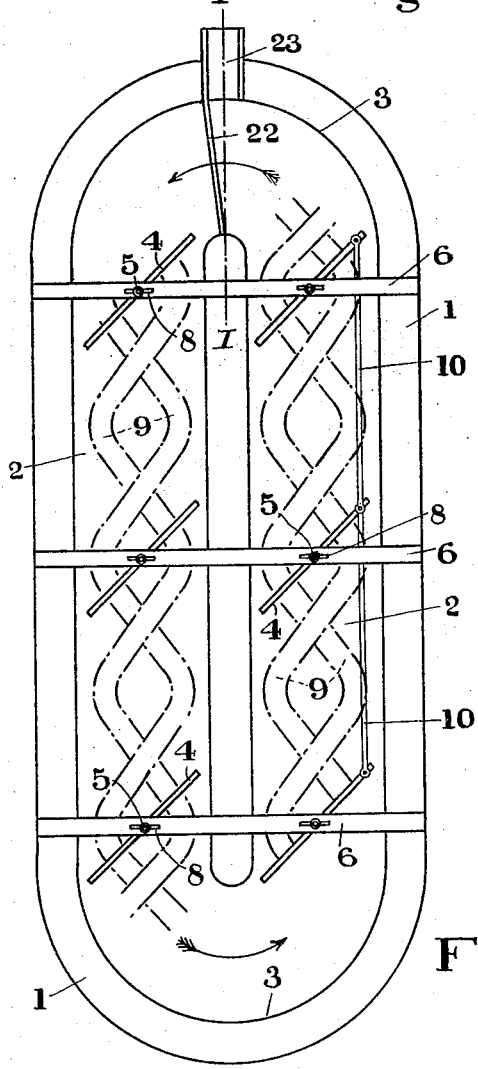
Figure 1 is a plan of a tank comprising two channels connected at their ends and fitted with one form of the invention.

The sewage tank 1 shown in Figures 1 and 2 comprises two circulating channels 2, 2, connected at their ends by bends 3. The bottoms 3' of the channels 2 are of semi-circular cross section. The sewage is propelled along the channels by mechanical means as well known in the art, these parts not being shown. Thin flat vanes 4 of metal or other suitable material are arranged at intervals in the channels 2, each being inclined to the direction of flow of the sewage along the channel. Each vane 4 is adjustably supported so that the inclination can be varied, for example each vane 4 is suspended by a rod 5 which passes through a cross bar 6 and is secured by a lock-nut 7 and a wing-nut 8. In the form shown in Figure 2 each vane is rectangular and is suspended in a position about half the depth of the channel whereas in the form shown in Figure 3 each vane is curved at its lower edge so that the vane can be set close down to the bottom of the channel. These vanes 4 impart a spiral motion to the sewage as it flows along the channels, as indicated by the broken lines 9 in Figure 1. The advantages of this spiral motion are that the lineal velocity along the channels is reduced and for this reason the circulating channels may be shorter than usual as more sewage is exposed to the surface for aeration in a given distance along a channel than is the case where the sewage is circulated at a higher lineal velocity straight along the channels. Moreover the solids in the sewage are more effectively prevented from settling because the spiral motion in the sewage sweeps the bottoms of the channels more effectively.

Less lineal velocity in the motion of the sewage is therefore required to prevent settlement and less power is necessary. The adjustment of the vanes enables the pitch of the spirals to be made longer or shorter as required for dry weather flow or for storm water. Storm water, requiring less aeration, can be more rapidly passed through the channels by adjusting the vanes to impart to the sewage a spiral course of longer pitch, thereby increasing the lineal velocity.

When it is desired to effect simultaneous adjustment of a number of vanes they are coupled together, for instance as indicated at the right hand side of Figure 1, the vanes 4 are linked together by iron rods 10.

Figure 6:
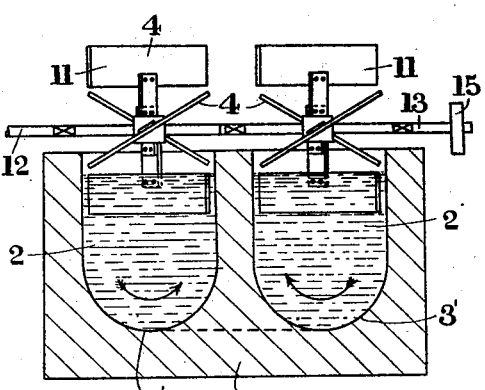

The vanes may be not only inclined to the direction of flow along the channels but may be moved relatively thereto so as to impart movement to the sewage, for example as indicated in Figures 5 and 6 the vanes 4 form inclined paddles on paddle wheels 11 mounted on shafts 12 and 13.

In the form of tank shown in Figure 5 the wheels 11 are at opposite ends of the adjacent channels and are driven in opposite directions so as to circulate the sewage round the two connected channels. The shafts 12 and 13 are fitted with pulleys 14 and 15 respectively, the pulleys being connected by a crossed belt 14'. As the wheels 11 rotate in opposite directions they are balanced as regards wind pressure. The shaft 12 may be driven from any convenient source of power.

In the form of tank shown in Figure 7, the sewage enters at the inlet of the tank and gravitates at slow lineal velocity to the delivery so that no power is required to propel the sewage. A series of channels 2 are connected in series by bends 3 alternately at opposite ends. Sewage mixed with activated sludge enters through pipes 16, 17, and after passing throughout the channels 2 reach a channel 18 and escape through a delivery pipe 19. All the channels are provided with inclined vanes 4 so that the sewage has a spiral motion imparted to it as it travels along them, there being sufficient head of sewage at the inlet end to maintain a spiral motion of self-cleansing velocity from one end of the tank to the other.

If a repeated treatment of the sewage is required then a pump, such as a spiral lift pump 20 may return sewage through a trough 21 to the first channel 2 of the tank.

Figure 4:
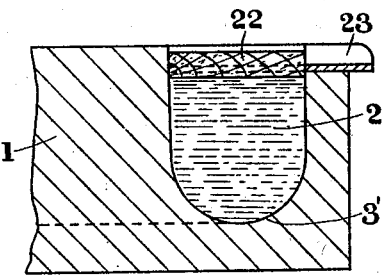
Figure 4 is a side sectional elevation on I—I, Figure 1.

In some instances in the method of sewage treatment to which the invention is applicable a scum forms on the surface of the sewage during circulation in the channels, which scum tends to prevent aeration of the sewage. In order to arrest the scum on the surface of the sewage and to remove it, a scum board 22 (Figures 1 and 4) spans the channel at an appropriate place, the scum being diverted by the board 22 and discharged over a spout 23 in the outer wall of the channel.

We claim:

1. A tank for use in the bio-aeration treatment of sewage comprising a plurality of relatively long and narrow open channels, the adjacent channels being connected at their ends for the purpose of forming a long path for the flow of sewage and exposure of said sewage to the air, and a plurality of vertical thin plate vanes arranged at intervals in said channels, said vanes being inclined to the direction of linear flow of sewage therethrough for the purpose of imparting a spiral motion to the sewage flowing through said channels to maintain the sludge in suspension in the sewage and to expose the combined sewage and sludge repeatedly to the atmosphere substantially as and for the purpose hereinbefore set forth.

2. A tank for use in the activated sludge system for the purification of sewage comprising a plurality of relatively long and narrow open channels, the adjacent channels being connected at their ends for the purpose of forming a prolonged path for the flow of sewage and exposure of said sewage to the air, a plurality of vertical thin plate vanes arranged at intervals in said channels at an inclination to the length of said channels and to the longitudinal flow of the sewage therethrough for the purpose of imparting a rolling spiral motion to the sewage, to bring sewage from the bottom to the top for repeated exposure to the air and means for moving said vanes about their vertical axes so as to adjust their inclination to the linear flow to vary the pitch of the rolling spiral movement of the sewage substantially as and for the purpose hereinbefore set forth.

In testimony whereof we have signed our names to this specification.

JOHN WILLIAM HARTLEY.
CYRIL JOHN HARTLEY.
JOSEPH AUGUSTINE HARTLEY.